United States Patent [19]

Graves

[11] 4,248,561

[45] Feb. 3, 1981

[54] ROUND BALE HANDLING DEVICE

[76] Inventor: Clarence C. Graves, P.O. Box 648, Clinton, Okla. 73601

[21] Appl. No.: 9,961

[22] Filed: Feb. 6, 1979

[51] Int. Cl.³ .......................... B60P 1/28; B60P 1/38
[52] U.S. Cl. .................. 414/24.5; 198/518; 198/817; 280/656; 414/491
[58] Field of Search ............ 414/24.5, 24.6, 111, 414/434, 435, 436, 484, 485, 491, 492, 528, 910, 911; 198/512, 516, 518, 726, 817; 298/5; 280/0.2, 43.11, 63, 656

[56] References Cited

U.S. PATENT DOCUMENTS

| | | | |
|---|---|---|---|
| 1,405,233 | 1/1922 | Lemoine | 198/817 |
| 2,597,218 | 5/1952 | Appel | 198/518 X |
| 2,728,601 | 12/1955 | Quigley | 298/5 X |
| 2,916,169 | 12/1959 | De Witt | 414/528 |
| 3,356,205 | 12/1967 | McLeod | 198/692 |
| 3,467,265 | 9/1969 | Miskin et al. | 198/518 |
| 3,952,895 | 4/1976 | Campbell | 414/491 X |
| 4,019,643 | 4/1977 | Kampman et al. | 414/491 X |
| 4,044,906 | 8/1977 | Schrag | 414/491 X |
| 4,050,598 | 9/1977 | Schurz | 414/24.5 |

*Primary Examiner*—Leslie J. Paperner
*Attorney, Agent, or Firm*—Harvey B. Jacobson

[57] ABSTRACT

The device includes a bed which is pivotally attached to a transverse axle supported by a pair of wheels. The bed is pivotable on the axle for lowering either end to a position proximate the supporting ground surface. The bed contains a pair of parallel beams, the free ends of which are attached to laterally diverging bale guides for surrounding a bale to be lifted onto the beams. The beams also contain downwardly converging bale contacting surfaces each of which includes a recessed conveyor chain having protruding spikes for engaging the bale. The beams are spaced so as to cradle the bale between them while the spikes slide the bale upwardly along the beams. A pivotal tongue is attached to the transverse axle for towing the device directly behind a tow vehicle or towing the device behind and laterally to one side of the tow vehicle.

11 Claims, 13 Drawing Figures

U.S. Patent  Feb. 3, 1981  Sheet 1 of 3  4,248,561
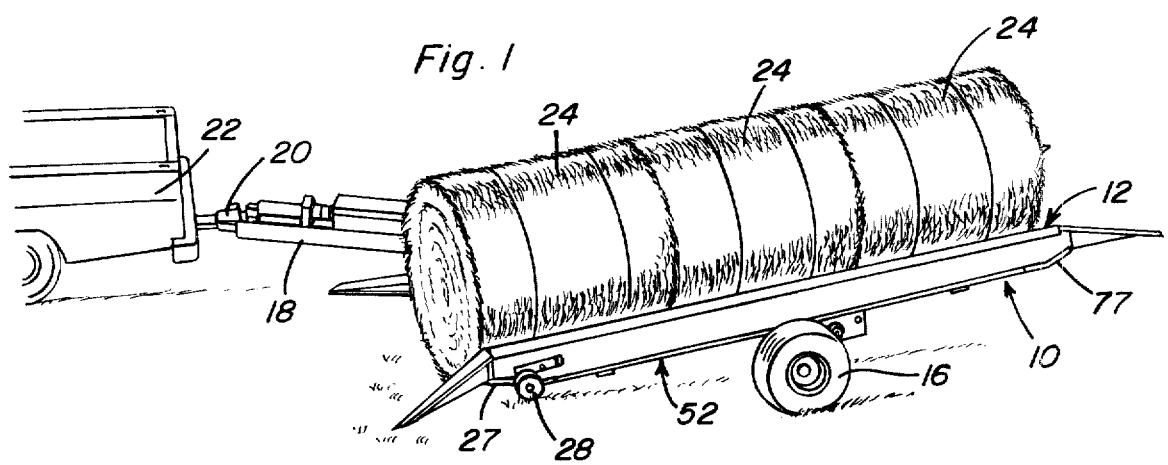
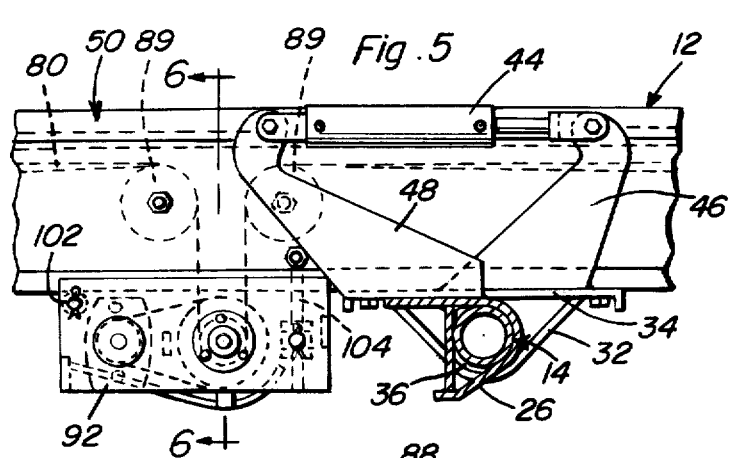
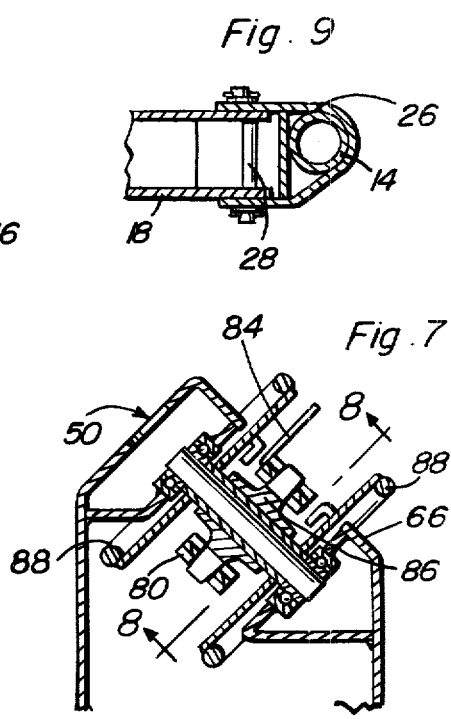
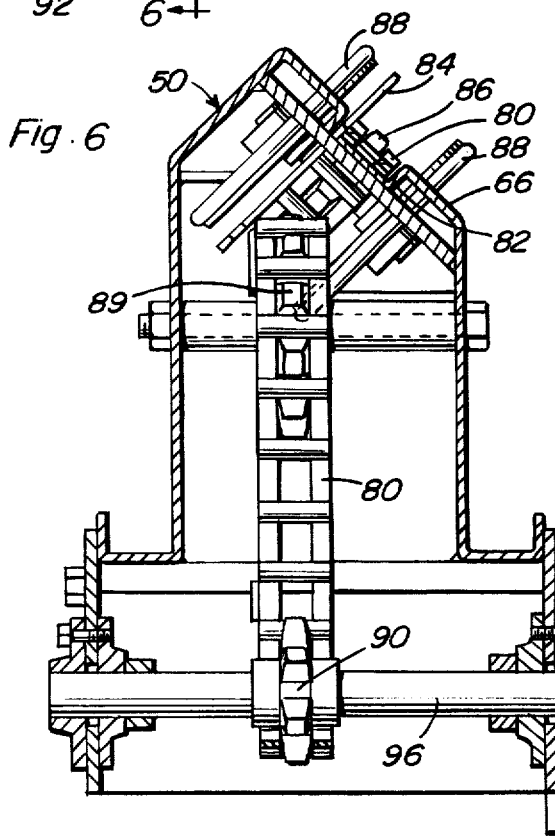
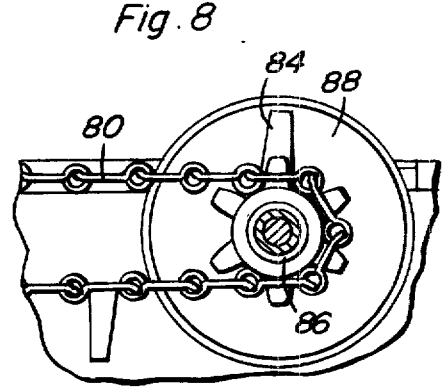

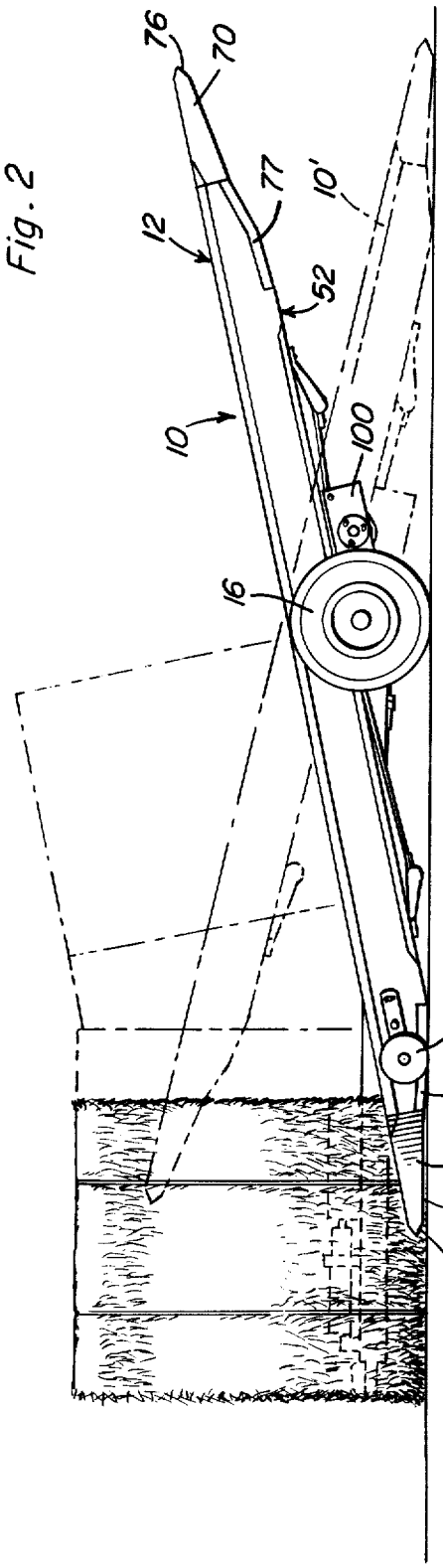
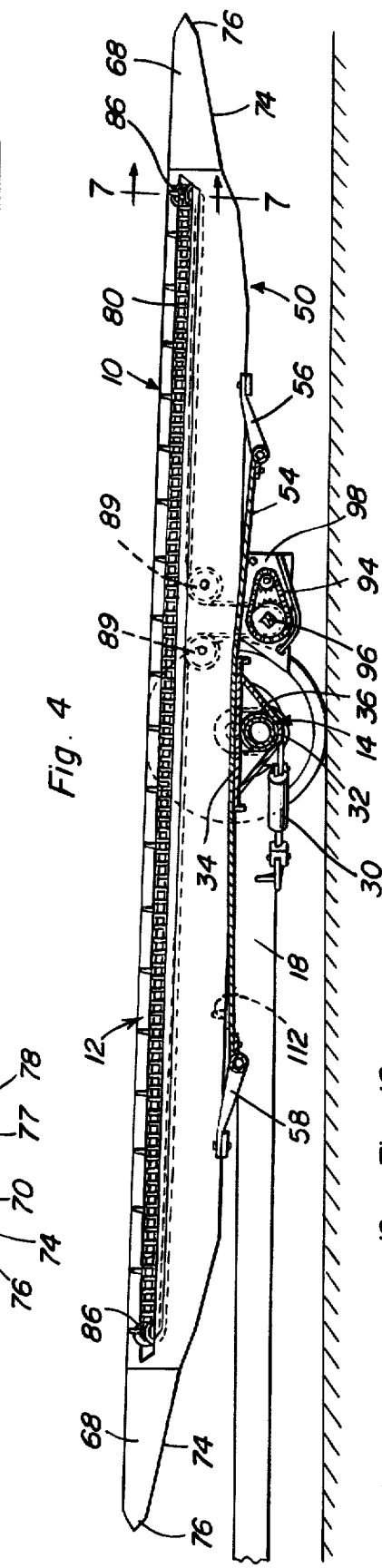
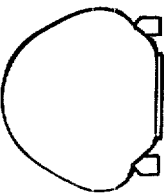
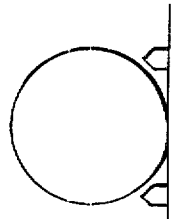
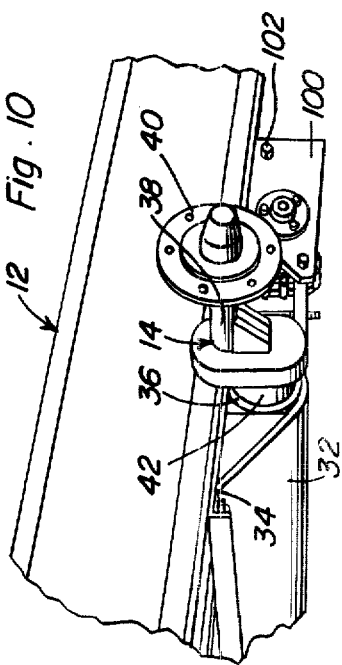

ROUND BALE HANDLING DEVICE

BACKGROUND OF THE INVENTION

1. Field of the Invention

This invention relates to trailer-like devices used for picking up and transporting multiple round bales.

2. Description of the Prior Art

It is a standard, modern farming practice to form hay or other foliage crops into large rolled cylindrically shaped or round bales which are scattered about the harvest area later to be transported to areas of utilization or processing. These bales often weight in the neighborhood of 1,500 pounds and are, therefore, difficult to manipulate and require mechanized systems for lifting and transporting them. Such systems must be as simple in construction as possible, yet must provide an efficient means to quickly lift these bales from the ground for transportation to nearby facilities.

Accordingly, certain mechanisms have been devised which take the form of a trailer to be towed behind a tractor or other farm vehicle. These trailers include platforms which can be tilted into a position whereby one end of the trailer is disposed beneath one end of the round hay bale and the bale is thereafter hauled up onto the trailer, which is then moved to a horizontal position for transporting the bale. One example of such a trailer can be seen in U.S. Pat. No. 3,951,288, issued Apr. 20, 1976, to Hale et al. The Hale et al device includes one end which is adapted to slide under a bale and lift it onto spaced parallel beams. The other end of the device includes means for accepting the bale and moving it to the opposite ends of the beams. The bale device also includes a pivotable tongue portion. U.S. Pat. No. 4,044,906, issued Aug. 30, 1977, to Schrag et al., shows a similar bale hauling apparatus which includes a pair of spaced bale receiving beams, each of which has a conveying chain disposed on the surface of it for moving the bales along the beams from either end to the opposite end thereof. U.S. Pat. No. 4,019,643, issued Apr. 26, 1977, to Kampman et al, shows another bale carrying apparatus which includes a pivotable tongue for disposing the apparatus either directly behind or behind and laterally to the side of the two vehicle. The Kampman et al device includes a plurality of conveyor belts disposed longitudinally of the apparatus bed for hauling a bale onto the bed and moving it therealong.

One common problem with these prior art devices consists in the manner in which one end of the bed must be slid under a hay bale in order to hoist the hay bale onto the bed. This can cause deterioration in the packed condition of the hay bale causing loss of hay. Furthermore, the receiving and discharge ends of the beds contain elements which can also pull or tear at the compacted bales.

SUMMARY OF THE INVENTION

The present invention includes a bale receiving and transporting bed mounted on a transverse axle which in turn is connected to a pivotable tongue for allowing the bed to be towed directly behind a two vehicle or to the rear and laterally of the two vehicle. The bed itself comprises a pair of longitudinally extending, parallel, spaced beams. On each end of the bed, attached to the beams, are diverging bale guides which are used to urge a bale into a central position between the beams. The beams are formed with downwardly converging slanted surfaces providing a large flat area upon which a bale may rest. Recessed within each flat surface is a conveyor chain which runs for the entire length of the beam. The chain is recessed so as not to be subjected to the weight of the bale. A plurality of spikes are attached to each conveyor chain and extend above the recess for engaging the bale and causing it to slide along the beam surfaces. When picking up a bale, the beams are positioned to either side of the bale, without being forced beneath the bale, at which time the spikes of the conveyors will engage the bale and slide it onto the beams. Disposed between the beams is a pan portion which has end yokes lowered below the position of the axle for engaging the bottom of a bale and urging it upwardly. Each yoke also converges toward the middle of the bed so as to gather loose hay to the center of the machine where it can be carried on the pan.

Accordingly, one object of the present invention is to provide a round bale handlingly device which includes spaced parallel bale supporting beams which can move a bale without the necessity of forcing the beams beneath the portion of the bale resting on the ground surface.

A further object of the present invention is to provide a round bale handling device wich can be operated to the rear and laterally of a tow vehicle in order that bales may be hoisted upon the device while the device is moving forwardly with the tow vehicle.

A still further object of the invention is to provide a round bale handling device which can be tilted either forwardly or rearwardly and can operate in either direction so that hay bales may be loaded or discharged from either end of the device.

Another object of the present invention is to provide a round bale handling device which inhibits the loss of loose hay by including a floor pan which urges any loose hay to the center of the device and provides support therefor.

Yet another still further object of the present invention is to provide a round bale handling device which moves bales through conveyor chain motion without having the bales rest directly on the conveyor chains, thus prolonging the life of the conveyor chains.

One additional object of the present invention is to provide a round bale handling device utilizing conveyor chains wherein structure is provided to allow the hay bale to contact the conveyor chain upon being received and upon being discharged without the conveyor chain becoming entangled with the hay bale causing loss of hay.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the round bale handling device of the present invention.

FIG. 2 is a side elevational view of the round bale handling device showing its two tilted positions.

FIG. 4 is a side elevational sectional view of the round bale handling device shown in its horizontal position.

FIG. 5 is a detailed view of the conveyor chain drive and the bed tilt mechanism of the present invention.

FIG. 6 is a sectional view taken substantially along a plane passing through section line 6—6 of FIG. 5.

FIG. 7 is a sectional view taken substantially along a plane passing through section line 7—7 of FIG. 4.

FIG. 8 is a sectional view taken substantially along a plane passing through section line 8—8 of FIG. 7.

FIG. 9 is a sectional view taken substantially along a plane passing through section line 9—9 of FIG. 3.

FIG. 10 is a detailed view showing the axle and hub assembly of the present invention.

FIG. 11a is a schematic representation showing the beams surrounding a hay bale about to be picked up.

FIG. 11b is a schematic representation showing a hay bale beginning to move along the beams.

FIG. 11c is a schematic representation showing a hay bale cradled between the beams and resting upon the floor pan.

DESCRIPTION OF THE PREFERRED EMBODIMENT

Figure 3:
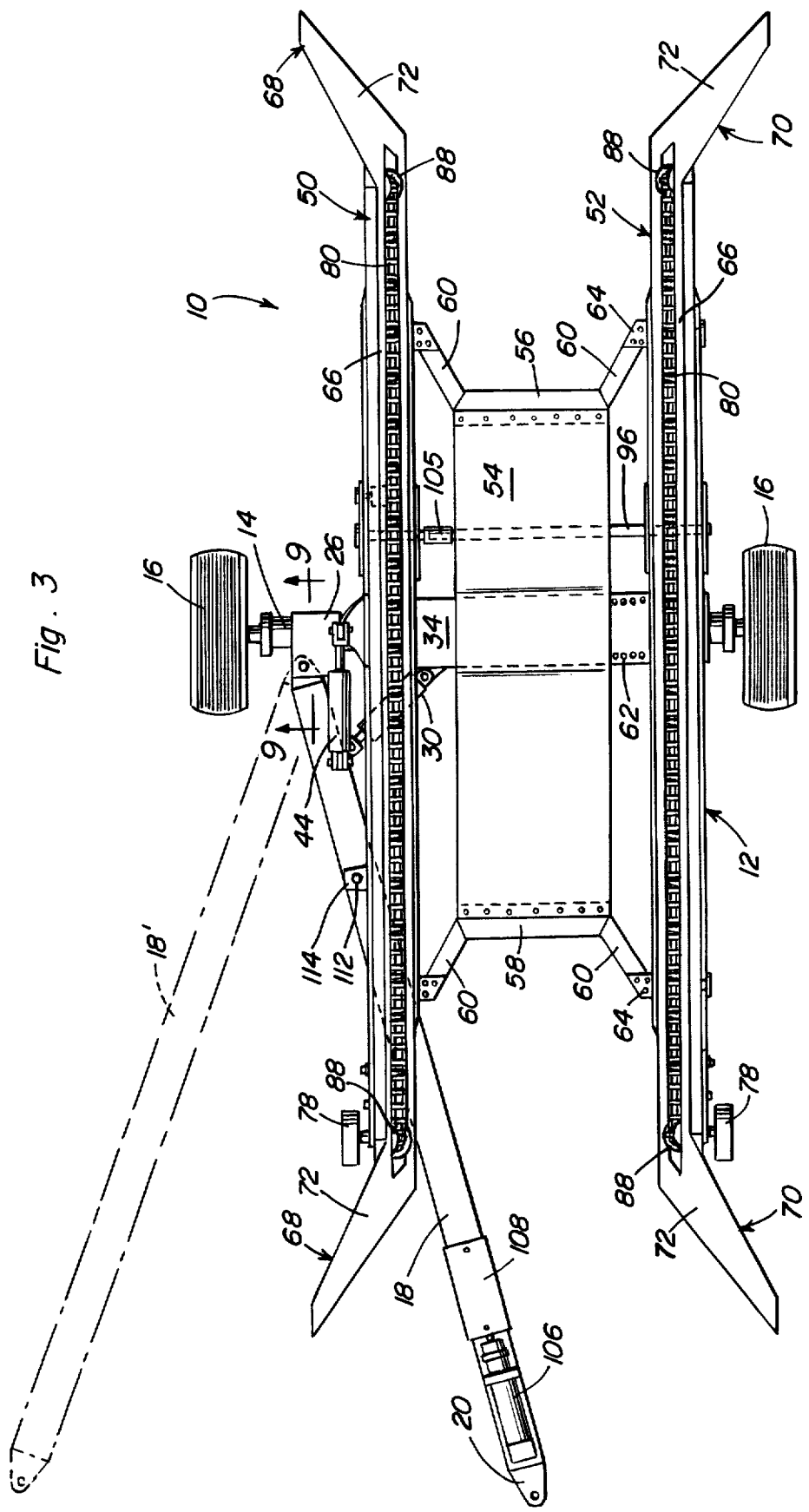
FIG. 3 is a plan view of the round bale handling device showing the two tongue positions thereof.

Now with reference to the drawings, the round bale handling device generally referred to by the numeral 10 will be described in detail. With particular reference to FIGS. 1 through 4, it can be seen that the bale handling device includes a bed portion 12 which is pivotally mounted on axle tube 14, which in turn is supported by wheels 16. The bed can be tilted so that either end rests on the ground as shown in FIG. 2 at 10 or in phantom in FIG. 2 at 10', or the bed may be positioned horizontally for transporting the bales as shown in FIG. 4. Also connected to the axle tube 14 is tongue 18 which pivots on the axle as seen in FIG. 3.

The tongue contains latch 20 which can be positioned directly in front of the bed 12 as shown in FIG. 3, or can be positioned ahead of and laterally to one side of bed 12 as shown in phantom in FIG. 3 with the tongue labelled 18'. With the tongue oriented in this second position, the latch 20 can be attached to a trailer hitch of a truck 22 as shown in FIG. 1, or any other appropriate farm vehicle, and the front of the bed will be accessible for communication with the round hay bale 24. In order to effect this lateral pivotal motion, a tongue pivot bracket 26, shown in FIGS. 3 and 9 is fixedly attached to the axle tube 14 and pivotally attached to tongue 18 by use of a pivot pin 28. Motion is produced by swing out cylinder 30 which has its piston free end attached to axle sleeve 32, which is rotatably secured about axle tube 14. Axle sleeve 32 is free to rotate about axle tube 14 and therefore the ends of cylinder 30 may be displayed vertically with respect to one another. Consequently, the pivot attachments of cylinder 30 should be effected through the use of ball and socket couplings or some other coupling which allows freedom of movement in all directions.

Axle sleeve 32 extends upwardly on both sides of axle 14 and is attached, preferably by weld joints, to bed plate 34, which comprises the support for bed 12, as seen most clearly in FIGS. 4 and 5. A bed plate pivot tube 36 is interposed between the bed plate, axle sleeve combination and the axle tube 14. Pivot tube 36 comprises the hinge joint which allows the bed plate and axle sleeve to freely rotate about axle 14.

With reference to FIG. 10, it is clearly apparent that axle tube 14 comprises hub support portion 38 which is attached to hub 40 and a lower offset bed support section 42. This offset allows the bed 12 to rest lower to the ground, thus reducing the angle through which the bed has to be tilted and likewise reduces the angle of incline along which the bales must be lifted. With reference to FIG. 5, it will be seen that a tilt cylinder 44, which is a three-position cylinder, is operatively engaged with bed plate 34 through rear tilt cylinder bracket 46, which is attached to the piston of cylinder 44. The cylinder portion of tilt cylinder 44 is attached to forward tilt cylinder bracket 48 which is fixedly attached to the tongue pivot bracket 26 which, as discussed above, is rigidly connected to the axle tube 14. Thus, with actuation of cylinder 44 effected, bed plate 34 with attached bed 12 can be rotated to three separate positions with respect to tongue pivot bracket 26 and axle 14.

Now, again with reference to FIGS. 1 through 4, it will be seen that bed 12 includes a pair of rigid, elongated, laterally spaced beams 50 and 52, each of which is fixedly attached to bed plate 34 through the longitudinal middle of each beam. Also attached to bed plate 34 is floor pan 54 which extends over the top of bed plate 34 and has ends which bend downwardly below the top of axle tube lower offset 42 where they are held in place by the yokes 56 and 58. The yokes are each attached to each of the beams 50 and 52 and bend downwardly therefrom to meet the ends of floor pan 54. It will also be noted that each yoke includes legs 60 with each pair of legs converging toward one another and toward the center of the bed 12. In this manner, the yoke arms can force loose hay toward the lateral center of the machine as the bales enter the machine while the downwardly tipped floor pan acts as a ramp to boost the hay up over the bed plate 34 and axle tube 14, thereby gently urging the loose hay upward and inward onto the bed to reduce loss of loose hay and minimize any abrupt contact of the bale with portions of the device which might tend to cause the bale to be torn apart. At this point, it should also be noted that beam 52 is bolted to bed plate 34 and the yokes 56 and 58. The beam position on bed plate 34 is adjustable by removing the bolts and sliding beam 52 laterally and reinserting bolts in any of the additional holes 62 provided in bed plate 34 for that purpose. Similar additional holes are provided on each of connector plates 64 of the yokes 56 and 58 for allowing for this adjustability feature. In this manner, various width bales may be handled by the device 10 by simply adjusting beams 52 to accommodate the bales.

The beams 50, 52 contain a number of features which provide superior bale handling characteristics. Each beam 50, 52 contains a slanted bale supporting surface 66, which is tilted to the contour of the bale. These surfaces may be clearly seen in FIG. 3 and the angle at which they are slanted is most clearly depicted in FIGS. 6 and 7, this angle being, preferably, 45° to the horizontal. It will be noted that the two surfaces 66 are disposed in opposing relationship with the surfaces converging downwardly toward the lateral center of the bale handling device. In this manner, the surfaces serve to cradle the bale held therebetween and prevent the bale from rolling off either side of the bed 12. By utilizing the wide bearing surface 66, the drag on the bale is minimized, which facilitates movement of the bale along the two beams. Further, the beams 50, 52 end in bale guides 68, 70, respectively. The bale guides are canted outwardly from their respective beams to form enlarged openings at either end of bed 12 to accept hay bales which are not perfectly centered on the bed. The bale guides urge the bale toward the center of the bed where it can be properly moved upwardly onto the beams.

Each of the bale guides includes a slanted face surface 72 which is coplanar with surface 66 of the beam to which the respective bale guide is attached. Surfaces 72 extend downwardly and terminate in knife blade-type edges which can slice under a bale to give it it lift and well as guidance. The lower surface 74 of bale guides 68, 70, is configured to be approximately parallel to the ground when the bale handling device is tilted in one direction or the other, as seen most clearly in FIG. 2. Lower surfaces 74 terminate in upwardly slanted edges 76 in order that the knife edges of the bale guides will not slice into the ground in the event that the bale guides might drop into a small depression in the ground. The bale guides are held slightly above the ground by skids 77 which are attached below beams 50, 52, and contact the ground when the device is in one of its tilted positions. When loosely baled hay has a lot of straw hanging toward the ground, or when a bale has settled and is almost flat on the bottom, the tapered surfaces 72 of the bale guides together with the bale guide outwardly canted configuration will gather the loose hay and force it back into its original configuration. The leading knife edge of the bale guides is designed to run at approximately $\frac{1}{8}''$ off the gound. This will let the guides get under all of the loose hay or, in the case of a flattened bale, get under the bale proper. If this leading knife edge is up as much as 2" above the ground, often there will be sufficient loose hay below this 2" line to cause a wedging action, rather than sweeping it loose from the ground. When the round bale handling device is being towed by a car or light pickup which has soft springs, it may be desirable to use gauge wheels 78 which are attached to the exterior walls of beams 50 and 52 and prevent bouncing of the tow vehicle from driving the bale guides into the ground. The gauge wheel 78 may be attached by means of bolts and preferably include enlarged bolt holes which allow for adjustability of the wheels.

With reference to FIGS. 4 through 8, it can be seen that each beam includes a conveying mechanism for moving the hay bales therealong. The conveying mechanism comprises a detachable link conveyor chain 80 which rides in recesses 82 formed in surfaces 66 of the beams. The conveyor chain 80 includes spikes 84 attached thereto which ride with the conveyor chain and extend upwardly out of the recesses 82 for making contact with the round bales and carrying the round bales along the surfaces 66 of the beams. In this manner, it is evident that the chains 80 themselves do not bear the weight of the bales but only serve to pull the bales longitudinally along the beams through contact of spikes 84 with the bales. Chain 80 extends through recess 82 and over end sprockets 86 which are positioned at each end of the beam. These sprockets are oriented with their axes parallel to surface 66 of the beam. These end sprockets are attached to walker disks 88 which are attached to and rotate with the sprockets. The walker disks 88 extend beyond the sprocket surface to a height approximately equal to that attained by spikes 84. The walkers serve to lift the bales above the sprockets to aid in both the loading and unloading of bales 24 with respect to the conveyor chains. When loading, the weight of the bale is initially exerted on the walker discs and these protrusions aid in moving the bale to the center of the beams, if it is not centered. Also, even though these larger walker disks are smooth and do not have teeth to propel the bale, being larger in diameter than the sprockets, more bale weight is exerted on them than on the beam surfaces at the time the bale crosses the disks and this gives the driving force needed to start the bale moving, and yet the bale is free to slip without causing breakage of the twine holding the bale. During unloading, if the chain with the attachment links is run over a sprocket only, as it breaks over the sprocket, the attachment links will hook and break the twine as well as pull hay from the compacted bale. By adding the walker disks to the sides of the sprocket, the hay is lifted off the attachment links thus reducing hay loss. It should further be noted that, even though sprockets 86 are shown in the drawings, a non-toothed roller may be used in space of the sprockets, if desired. After passing over end sprocket 86, the conveyor chain 80 passes over idler sprockets 89 which are positioned within the beams themselves and have their axes oriented horizontally. Thus it can be seen that as the chain passes from end sprocket 86 to idler sprocket 89, it undergoes a twist from the 45° orientation to a purely horizontal orientation. After passing over the idler sprockets 89, the chain engages drive sprocket 90 which is driven by reversible motor 92 through chain and sprocket drive 94 and drive shaft 96, upon which the drive sprocket 90 is mounted. It should be noted that by virtue of the twist of chain 80 between end sprockets 86 and idler sprocket 89, the conveyor systems of both beam 50 and beam 52 can be driven by a single horizontally oriented drive shaft without the need of universal joints, bevel gears, or the like. The drive shaft and the motor are supported by a pair of cradles 98 and 100, which are attached, respectively, to the bottom of beam 50 and beam 52. Cradle 98 holds the motor 92, chain and sprocket drives 94 and one end of drive shaft 96, while cradle 100 contains the bearings which support and journal the opposite end of drive shaft 96. Each cradle contains a pivot bar 102 which connects the cradle pivotally to the bottom of its respective beam, and an adjustable support rod 104 which allows the opposite end of the cradle to be raised or lowered with respect to its respective beam to effect tensioning of the two conveyor chains. The cradles are individually adjustable in this manner in order that each chain may have its tension individually adjusted. Also, it will be seen that shaft 96 contains a telescoping coupling 105, which allows the shaft length to vary in accordance with the setting of adjustable beam 52, as discussed above.

Swing out cylinder 30, tilt cylinder 44 and motor 92 are all hydraulically operated through appropriate valving mechanisms which may be attached to the side of one beam in close proximity to these elements. The hydraulic source includes an electric actuated hydraulic pump 106 which is mounted on the forward end of tongue 18 and connected to a large battery 108 for operation thereof. The battery 108 is also located on the tongue and may be connected by appropriate connecting cables to the alternator system of the tow vehicle to keep the battery charged, or the battery may be charged periodically with a heavy duty battery charger. Appropriate hydraulic cables will, of course, be connected to the cylinders and motor as would be apparent to one of ordinary skill in the art.

In operation, the bed 12 would be disposed in its horizontal position and tongue 18 would be disposed in its inward position with hitch 20 forward of bed 12. The hitch would then be connected to the rear of a tow vehicle for transporting the round bale handling device to a field for use. In order to insure that the hitch would not inadvertently swing from this position, a tapered locking dowel 112 is inserted through mounting flange 114 and into the tongue 18. When a lifting operation is to begin, the dowel is removed and tongue 18 is swung to its outward position as shown at 18' in FIG. 3. The bed then can be tilted forwardly as shown in FIG. 2 at which time the lower bale guides 68 and 70 are operative to urge a bale into the center of beams 50 and 52 and the beams would straddle both sides of a hay bale as shown in FIG. 11a. The conveyor drive motor 92 would be operated at this point and walker disks 88 would urge the bale onto the beams at which point the spikes would engage and pull the bale upwardly along the beams as shown in FIG. 11b. The lower yokes would urge loose hay in toward the center of the beams and this loose hay would be lifted by floor pan 54 with the beams cradling the bale therebetween at the same time as shown in FIG. 11c. At this point the hydraulic motor operating the conveyor belt may be stopped. All functions can be controlled from the single box laying on the seat beside the two vehicle driver. The box is connected to a multi-strand electric cable which extends backward to control valves which operate the pistons and hydraulic motor. Once a bale is on the bale handling device, the device may be moved forward in its tilted position to contact a second bale, and then a third bale until it is fully loaded as shown in FIG. 1. At this time the device would be placed in its horizontal position to be towed to the utilization area.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A round foliage bale handling apparatus for picking up and transporting a bale of foliage, said apparatus comprising in combination:
    an axle having a pair of support wheels attached thereto;
    a longitudinally extending bed having a pair of longitudinally spaced ends and connected along the longitudinal middle thereof to said axle, said bed being disposed for pivotal motion about said axle for causing either of said ends to assume a position immediately adjacent a support surface for said wheels; said bed including a pair of laterally spaced, parallel beam members, each beam member including a slanted bale contacting face running for substantially the entire extent of each beam, said faces being disposed in a downwardly converging arrangement for cradling a bale therebetween; and
    power actuated conveyor means attached to each of said beams for causing bale movement along said faces, said power actuated conveyor means including a separate endless conveyor chain disposed longitudinally of each of said beams; and further wherein each of said beams includes a longitudinally extending recess in its respective bale contacting face, one portion of each of said conveyor chains being partially disposed respectivley in each of said recesses for causing the weight of a bale to be borne by said faces rather than said chains; spike means distributed along said conveyor chains for extending upwardly from said recesses for engaging said bales to move said bales along said faces; and
    idler means disposed on each end of each beam for supporting the ends of said conveyor chains, each of said idler means including a walker disk means comprising a disk element having a smooth outer periphery for contacting and providing lift to a bale as it is transported over the ends of said conveyor chains without gouging or biting into the bale.

2. The apparatus of claim 1 including adjustment means for allowing lateral displacement of at least one of said beams to accommodate different size bales.

3. The apparatus of claim 2 and further wherein said axle has a lower offset portion, said lower offset portion being attached to said bed.

4. The apparatus of claim 3 wherein said bed is attached to a pivot means which is concentrically, pivotally connected to said lower offset portion.

5. The apparatus of claim 1 and further including a tongue pivotally attached to said axle, said tongue including a latch means for engagement with a tow vehicle, said tongue being movable between a first position extending beneath said bed with said latch means disposed directly ahead of said bed and a second position extending obliquely from said bed with said latch means disposed ahead of and laterally to one side of said bed.

6. The apparatus of claim 5 and further including a hydraulic cylinder attached between said tongue and said axle for causing powered displacement of said tongue between said first and second positions, and further including a positive attachment means for connecting said tongue to said bed when said tongue is in its first position to insure that no inadvertent pivoting of said tongue will occur during towing of the apparatus.

7. A round foliage bale handling apparatus for picking up and transporting a bale of foliage, said apparatus comprising in combination:
    an axle having a pair of support wheels attached thereto;
    a longitudinally extending bed having a pair of longitudinally spaced ends and connected along the longitudinal middle thereof to said axle, said bed being disposed for pivotal motion about said axle for causing either of said ends to assume a position immediately adjacent a support surface for said wheels; said bed including a pair of laterally spaced, parallel beam members, each beam member including a slanted bale contacting face running for substantially the entire extent of each beam, said faces being disposed in a downwardly converging arrangement for cradling a bale therebetween; and
    power actuated conveyor means attached to each of said beams for causing bale movement along said faces, said power actuated conveyor means including a separate endless conveyor chain disposed longitudinally of each of said beams; and further wherein each of said beams includes a longitudinally extending recess in its respective bale contacting face, one portion of each of said conveyor chains being partially disposed respectively in each of said recesses for causing the weight of a bale to be borne by said faces rather than said chains; spike means distributed along said conveyor chains for extending upwardly from said recesses for engaging said bales to move said bales along said faces, said conveyor means further including an idler means disposed at each end of each of said recesses for supporting the ends of said conveyor chains, each of said idler means including walker disk means attached to said idler means for providing lift to a bale as it moves over the ends of the conveyor chain, said conveyor means further including a drive means comprising a drive motor and a transversely extending drive shaft connected to each of said conveyor chains, each of said conveyor chains having a lateral dimension oriented parallel to its respective face and undergoing a twist from the position of contact of said chain to said idle means to provide a horizontal disposition of said lateral dimension when said chain contacts said drive shaft.

8. The apparatus of claim 7 and further including a pair of support cradles for supporting the ends of said drive shaft, each of said cradles being pivotally attached to a separate one of said beams for allowing individual vertical displacement of each end of said drive shaft thereby providing individual tensioning for said conveyor chains.

9. A round foliage bale handling apparatus for picking up and transporting a bale of foliage, said apparatus comprising in combination:
   an axle having a pair of support wheels attached thereto;
   a longitudinally extending bed having a pair of longitudinally spaced ends and connected along the longitudinal middle thereof to said axle, said bed being disposed for pivotal motion about said axle for causing either of said ends to assume a position immediately adjacent a support surface for said wheels; said bed including a pair of laterally spaced, parallel beam members, each beam member including a slanted bale contacting face running for substantially the entire extent of each beam, said faces being disposed in a downwardly converging arrangement for cradling a bale therebetween; and
   power actuated conveyor means attached to each of said beams for causing bale movement along said faces, a floor pan disposed between said beams and extending longitudinally of said bed, said floor pan having a central portion disposed over said axle and having ends disposed below the level of said axle for providing a ramp for urging bales upwardly over said axle.

10. The apparatus of claim 9 wherein said floor pan further includes a yoke means attached to each of said ends, said yoke means having inwardly converging legs for urging loose foliage of bales toward the center of said bed.

11. A round foliage bale handling apparatus for picking up and transporting a bale of foliage, said apparatus comprising in combination:
   an axle having a pair of support wheels attached thereto;
   a longitudinally extending bed having a pair of longitudinally spaced ends and connected along the longitudinal middle thereof to said axle, said bed being disposed for pivotal motion about said axle for causing either of said ends to assume a position immediately adjacent a support surface for said wheels; said bed including a pair of laterally spaced, parallel beam members, each beam member including a slanted bale contacting face running for substantially the entire extent of each beam, said faces being disposed in a downwardly converging arrangement for cradling a bale therebetween; and
   power actuated conveyor means attached to each of said beams for causing bale movement along said faces, wherein each of said beams includes an outwardly canted bale guide attached to at least one end of each of said beams, each bale guide having a bale engaging face which is coplanar with the face of the beam to which it is attached, said bale guide faces terminating in edges which extend longitudinally of the bale guides for allowing the bale guides to slice under a bale thereby giving it lift.

* * * * *